United States Patent [19]

Parman

[11] Patent Number: 5,009,024
[45] Date of Patent: Apr. 23, 1991

[54] ARTIFICIAL LURE SIMULATING FROG MOVEMENTS

[76] Inventor: Steven E. Parman, 223 Roy St., Kerrville, Tex. 78028

[21] Appl. No.: 401,051

[22] Filed: Aug. 31, 1989

[51] Int. Cl.$^5$ ............................................. A01K 85/00
[52] U.S. Cl. ..................................... 43/42.3; 43/42.03; 43/42.24; 43/42.36
[58] Field of Search ................. 43/42.49, 42.36, 42.03, 43/42.24

[56] References Cited

U.S. PATENT DOCUMENTS

| | | | |
|---|---|---|---|
| 2,491,846 | 12/1949 | Boekenoogen | 43/42.3 |
| 2,504,229 | 4/1950 | Sinclair | 43/42.3 |
| 2,534,482 | 12/1950 | Terhorst | 43/42.3 |
| 2,607,151 | 8/1952 | Morris et al. | 43/42.3 |
| 2,611,205 | 9/1952 | Steel | 43/42.3 |
| 3,376,663 | 4/1968 | Amrine | 43/42.3 |

Primary Examiner—Richard K. Seidel
Assistant Examiner—Chuck Y. Mah
Attorney, Agent, or Firm—Cox & Smith

[57] ABSTRACT

An artificial lure is provided which simulates the swimming motion of a frog with a pair of elastically flexible appendages attached to the rear of the lure. Each of the rear appendages, as well as two frontal appendages, has an S-shape, and the rear appendages are provided with thigh portions and foot members which are biased transversely relative to the direction of travel of the lure and which are provided with exaggerated dimensions to increase the effect of drag forces thereon. The foot members of the rear appendages specifically have ridges on their upper surfaces, one of which is adjacent the leading edge with particularities to further increase the effect of drag forces on the foot member.

8 Claims, 2 Drawing Sheets

ARTIFICIAL LURE SIMULATING FROG MOVEMENTS

BACKGROUND OF THE INVENTION

The present invention relates to fishing lures and, more particularly, to fishing lures which have features for creating life-like movements simulating the appearance of a frog when drawn through the water.

Artificial fishing lures have been around for centuries, dating back at least to the employment of sea shells as spoon-like artifical lures by early American Indians. The development of fishing lures since then has been broad and expansive, to say the least. From lures which entice the appetite, to those which spurn instinctive defenses, man has tried steadfastly to lure the interest of his finned friends of the aquatic world through innumerable improvements in the artificial lure.

In the process, many have tried to simulate the swimming motion of aquatic animals through the use of curved, flexible members trailing behind the lure. As such a lure is drawn through the water, drag forces come into play which tend to stretch the flexible members rearward. If the lure is elastic and sufficiently flexible, the appendages of the lure will oscillate between its unflexed shape and its fully extended shape as the lure accelerates and decelerates in a cyclic fashion, appearing much like a swimming creature. The extent of such life-like movement, therefore, depends on the acceleration of the lure (i.e., the manner of reeling in the lure) as well as on the characteristic responsiveness of the lure to such acceleration.

Many features have been employed in artificial lures for the purpose of enhancing the characteristic drag coefficients of the lure as it is drawn through the water. For instance, U.S. Pat. No. 2,690,026, issued to King, discloses a snake-like lure formed of flexible material that is biased into a serpentine configuration but also has a scoop at its rear extremity. The scoop increases the drag at that rear extremity to cause the body of the lure to become straight when pulled across the surface of the water. The resulting oscillation as the lure decelerates provides the lure with a life-like appearance which tends to attract the interest of fish.

Of all aquatic animals, the frog is believed to be the one which is most sought-after by freshwater fish. Therefore, many have attempted to entice the appetite of fish by producing lures that have the appearance, size and texture which simulate those aspects of a frog. The most common approach of achieving such simulation is through the provision of flexible appendages trailing behind a lure body as it is drawn through the water. If those members are curved or bent, the life-like motions of a frog may be simulated as the lure is reeled through the water. The U.S. Pat. Nos. 3,105,317; 4,530,179; 3,868,784; 2,867,933; and 2,738,611 are examples. U.S. Pat. Nos. 4,074,455 and 4,771,567 disclose lures having the appearance of other aquatic animals with appendages that flex during the movement of the lure through water. Nevertheless, man continues his endeavor to produce still more improved fishing lures.

SUMMARY OF THE INVENTION

It is an object of the present invention to provide a lure which tends to attract the interest of fish and which further tends to entice a strike by the fish.

A further object of the present invention provides an artificial lure which is capable of simulating the swimming motion of a frog.

Another object of the present invention is to provide an artificial fishing lure having appendages which simulate the legs of a swimming frog in use and which further provide for pronounced or exaggerated movement thereof.

It is yet another object of the present invention to provide a frog-simulating lure having appendages which are adapted to increase the drag forces acting thereon.

Applicant has addressed such objects and otherwise improved over the prior art by producing a lure which simulates the swimming motion of a frog by means of flexible appendages having an S-shape and other features which tend to cause the appendages to flex rearwardly in a pronounced manner as the lure accelerates and then recoil elastically as the lure decelerates.

The other features of the invention which contribute to simulating the swimming motion of a frog include a specially adapted foot member at the distal end of each rear appendage, which foot member is biased transversely relative to the direction of travel of the lure. The foot member further has a leading edge which is biased to face that direction of travel and which has a profile height biased perpendicularly to said direction of travel. A ridge protruding from the upper surface of each foot member adjacent the leading edge further enhances the drag characteristics of the foot members by increasing the stagnation pressure at that leading edge and creating a relative vacuum on the trailing surface of the ridge. The thickness of the foot member is greatest at the ridge adjacent the leading edge, particularly in the region toward the tip of each foot member. The increased drag produced by such features is further enhanced by an overall structure which biases the leading edge to face forward during travel through the water.

Other remarkable features of the invention include a thigh portion of each of the two rear appendages, which thigh portion has a breadth that tapers toward its connection with the body of the lure to enable pronounced movement of the thigh relative to the body. Both the thigh portion and the foot member of each appendage are biased with a forward inclination relative to the direction of travel in order to further enhance their drag characteristics, and a shank having a smaller breadth than either the thigh portion or the foot member provides a connection between the thigh and the foot to facilitate pronounced movement of the foot member as the lure is drawn through the water. Additionally, forward appendages are provided which also have an S-shape, and the lure may be provided with a jig-type hook having a weight integral therewith for facilitating catching a fish. The combination of both front and rear appendages and their features with the lure body produces an overall interaction which is remarkably similar in appearance to the action of a swimming frog.

Many other objects, features, alternatives and advantages of the present invention will be obvious from the following more detailed description, especially when considered in conjunction with the attached drawings and the appended claims.

A BRIEF DESCRIPTION OF THE DRAWINGS

FIG. 1 shows a plan view of lure 10 as it is shaped when unstressed.

FIG. 2 shows a first cross-sectional view of the foot member 50 of lure 10 as viewed on sectional line 2—2 of FIG. 1.

FIG. 3 shows a second cross-sectional view of the foot member 50 of lure 10 as viewed on sectional line 3—3 of FIG. 1.

FIGS. 4A-4E show a series of sequential views of the frog member 20 of lure 10 as it would typically appear during the course of a single acceleration-deceleration cycle through water.

DETAILED DESCRIPTION OF THE PREFERRED EMBODIMENT

Figure 1:
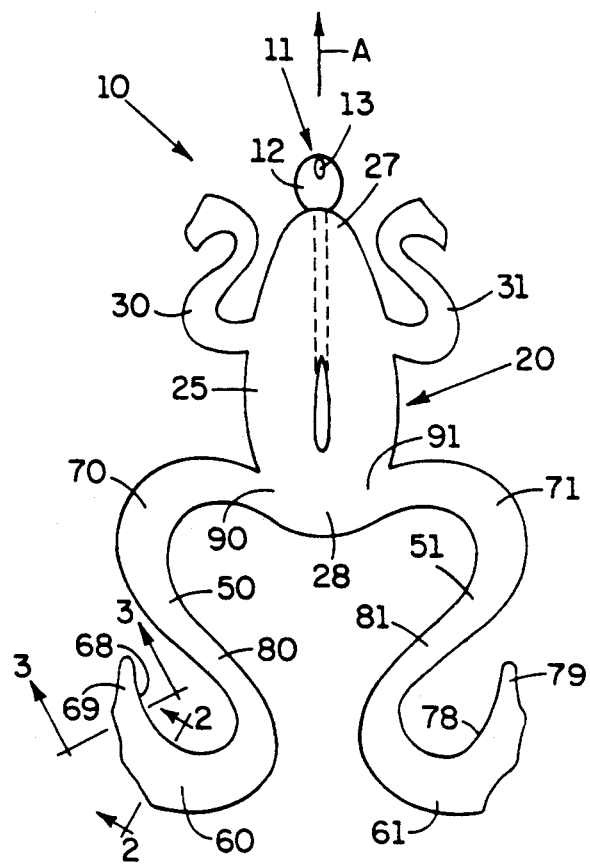

Referring to FIG. 1, the present invention is preferably embodied as lure 10 which is structured to give the life-like appearance of a swimming frog when lure 10 is drawn (or reeled) through water in a cyclic fashion, as will be discussed further herein. Lure 10 comprises weighted hook 11 and frog member 20, although frog member 20 embodies the essence of the invention.

Frog member 20 is symmetrical and basically comprises a body 25 having two S-shaped forward appendages 30 and 31 and two S-shaped rearward appendages 50 and 51. Frog member 20 is formed of a rubber-like material which is elastically flexible and which may be impregnated with colorings for simulating the appearance of a frog such as is indicated in FIGS. 4A-4E. Frog member 20 is cast with an open-face casting. Body 25 is substantially elliptical in the plan view but has protrusions 26 (numbered in FIG. 4A) in the forward portion thereof for simulating the appearance of eyes.

Weighted hook 11 is a conventional jig-type fish hook having a jighead weight 12 formed integrally therewith. Eyelet 13 is formed on the forward upper surface of weight 12 for enabling connection with a fishing line or leader. The hook 11 is centrally disposed through the rubber-like material of body 25 so that its shank extends from the nose 27 to the proximity of the tail 28 of body 25, in which proximity the barbed portion 14 of hook 11 protrudes from body 25. The body 25, of course, could be produced and sold separately from hook 11.

The rearward appendages 50 and 51 of frog member 20 have thigh portions 70 and 71 in the respective proximal portions thereof and foot members 60 and 61 at the respective distal ends thereof. The shanks 80 and 81 of appendages 50 and 51, respectively, connect the respective foot members 60 and 61 to the respective thigh portions 70 and 71. Appendages 50 and 51 are connected to the body 25 at hip regions 90 and 91, respectively, with thigh portions 70 and 71 contiguous to body 25. When unstressed (as shown in FIG. 1), appendages 50 and 51 depart from body 25 at a forward inclination relative to the general direction of travel A. The tips 69 and 79 of foot members 60 and 61 are similarly forwardly inclined relative to the general direction of travel A. Such forward inclination enhances the life-like appearance of lure 10 by ensuring pronounced movement of appendages 50 and 51 when lure 10 is drawn in a cyclic fashion through the water, the appendages 50 and 51 being drawn rearward of body 20 when lure 10 accelerates and then being recoiled toward the configuration shown in FIG. 1 as lure 10 decelerates to zero velocity. The forward inclination of thigh portions 70 and 71 and of the foot members 60 and 61 also increases the drag coefficients thereof.

Thigh portions 70 and 71 have greater breadth (breadth being the transverse dimension evident in FIG. 1) and greater thickness (thickness being the transverse dimension perpendicular to the plane of FIG. 1) than shanks 80 and 81, in order to increase the drag forces acting on thigh portions 70 and 71 as lure 10 travels through the water in the direction of travel A. The breadth of thigh portions 70 and 71 is also tapered toward hip regions 90 and 91 so that thigh portions 70 and 71 tend to pivot rearwardly about their respective connections to body 25 when subjected to varying drag forces.

Similarly, foot members 60 and 61 are broader than shanks 80 and 81 so that foot members 60 and 61 tend to pivot rearwardly relative to shanks 80 and 81 when foot members 60 and 61 are subjected to varying drag forces. More particularly, the breadth is larger in portions of foot members 60 and 61 than at any location in either of thigh portions 70 and 71 or shanks 80 and 81. That enlarged breadth increases the drag forces acting on foot members 60 and 61 by providing a substantial surface area upon which skin friction forces act. The breadth of foot members 60 and 61 also tends to create a rudder-like effect which cooperates with the general integrity of appendages 50 and 51 to bias the leading edges 68 and 78 to face forward during travel.

Figure 2:
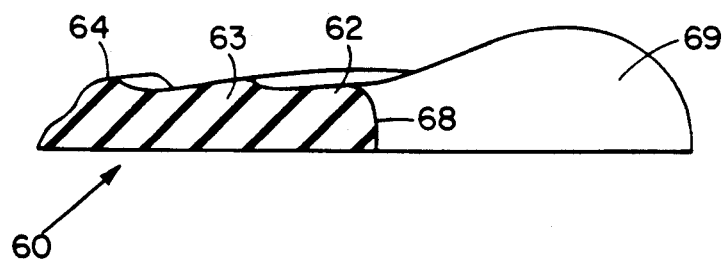
Figure 3:
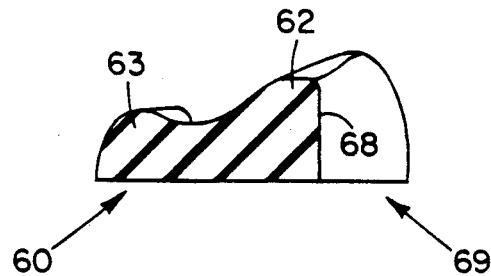

Each of foot members 60 and 61 are also provided with four ridges, three of which are shown in FIG. 2 as ridges 62-64, protruding from the upper surface of foot member 60 in a direction perpendicular to direction of travel A. Each of such ridges are curved in the plan view to match the curvature of the respective foot member 60. Referring to foot member 60 as it is shown in FIGS. 2 and 3, ridges 62-64 serve to further increase the drag forces acting on foot members 60 and 61 during travel while also simulating the appearance of the toes of a frog. Ridge 62, which is adjacent the leading edge 68 of foot member 60, protrudes further from the upper surface of foot member 60 than do the other ridges 63 and 64, especially in the tip region 69 thereof. In fact, the thickness of foot member 60 is greatest at ridge 62 in tip region 69 and, at that location, is at least twice the average thickness of foot member 60. Foot member 61 is symmetrically similar to foot member 60 and, as such, is formed with ridges similar to ridges 62-64 protruding from the upper surface thereof.

The leading edge 68 of foot member 60 is a substantially vertical surface, as shown in FIGS. 2 and 3, which is biased by the overall structure of appendage 50 in a manner such that its profile height (i.e., the dimensions shown vertical in FIGS. 2 and 3) is biased perpendicular to the direction of travel A when drawn through the water. Such perpendicular bias tends to increase the stagnation pressure of the flow around foot member 60 (i.e., the pressure caused by stagnation of flow at the leading edge), thereby further increasing the drag forces acting thereon.

As mentioned, the tips 68 and 78 of foot members 60 and 61, respectively, are biased in the forward direction due to their forward inclination in the relaxed state. Consequently, despite rearward flexure of foot members 60 and 61 as lure 10 is drawn through water 100 in the direction of travel A, foot members 60 and 61 and their respective leading edges 68 and 78 are biased transversely relative to the direction of travel A. As a result, the drag induced by foot members 60 and 61, and especially the leading edges 68 and 78, is enhanced. The same is true of thigh portions 70 and 71.

Figure 4A:
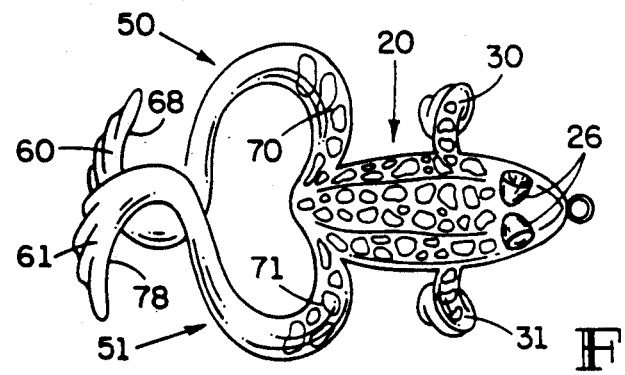

Thus, when lure 10 is drawn in a cyclic fashion through water, the various features of appendages 50 and 51 combine to attribute movements that simulate the appearance of a swimming frog. More specifically, when lure 10 is reeled through water such that it repeatedly accelerates and decelerates relative to the water, the overall interplay of drag forces acting on the appendages 50 and 51 causes the appendages 50 and 51 to oscillate between an unstressed configuration (such as shown in FIGS. 1, 4A or 4E) and a second configuration in which appendages 50 and 51 are stretched rearwardly and are drawn together (such as shown in FIG. 4C) to give the overall appearance of a frog swimming through the water.

Figure 4B:
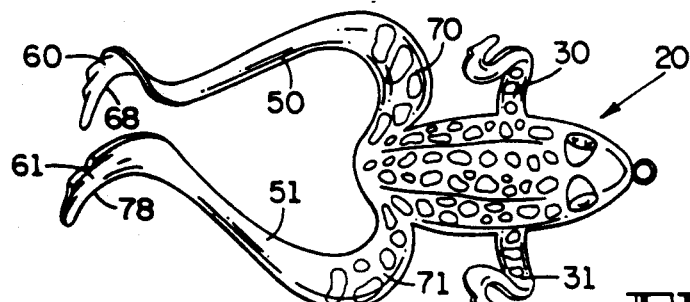
Figure 4C:
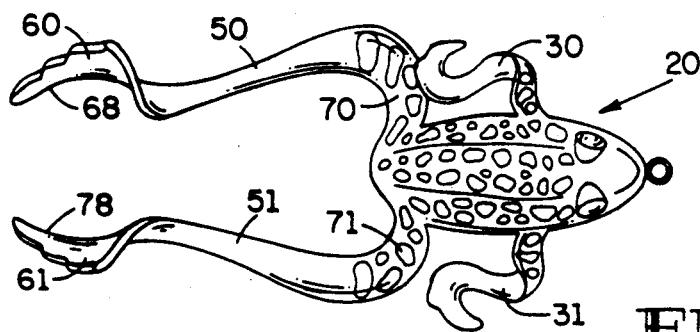
Figure 4D:
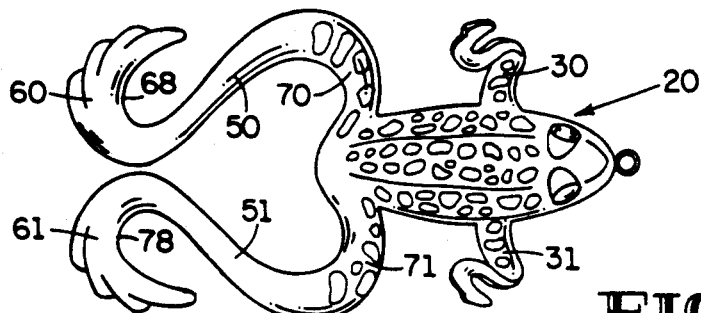
Figure 4E:
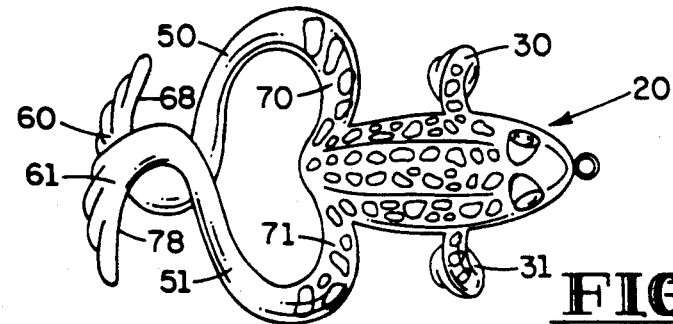

In actuality, because appendages 50 and 51 are flexible, some twisting of appendages 50 and 51 may occur at the locations of thinner cross section, such as is evident in FIGS. 4B and 4C. Such twisting is tempered (or balanced) by the hydrodynamic forces acting on foot members 60 and 61 such that leading edges 68 and 78 tend to be maintained perpendicular and forward-facing throughout operation. The overall result is realistically depicted in FIGS. 4A–4E, which show several stages in the oscillatory motion of frog member 20, in sequence, as frog member 20 is drawn through the water, the oscillation progressing sequentially from the overall unstressed position shown in FIG. 4A through that shown in FIG. 4C and back to a relatively unstressed position such as shown in FIG. 4E.

Although the invention has been described in terms of the above embodiment, many changes, variations, substitutions and alterations would be obvious to one of ordinary skill in the art and are intended to fall within the scope of the present invention. The scope of the invention is, therefore, not limited by the foregoing but rather is defined by the following claims.

What is claimed is:

1. A flexible lure member for use in an artificial lure to simulate the swimming motion of a frog comprising:
   a body which is adaptable to be connected to a fishing line for drawing said body through water in a direction of travel forward relative to said body;
   a pair of elastically flexible appendages attached to the rear of said body, each of said appendages having an S-shape and having a foot member at the distal end thereof, wherein:
      said foot member is biased transversely relative to said forward direction; and
      said foot member has a leading edge which is biased to face said forward direction of travel, the profile height of the leading edge being biased perpendicular to said forward direction of travel and said profile height of the leading edge is the greatest thickness of said foot member.

2. The flexible lure member of claim 1 wherein each of said foot members has a tip which is biased to be inclined relative to said forward direction of travel.

3. The flexible lure member of claim 2 wherein each of said appendages further has:
   a thigh portion contiguously connected with said body; and
   a shank disposed between the thigh portion and the foot member thereof, said shank having a smaller breadth than said thigh portion, and the breadth of said thigh portion tapering toward said body.

4. The flexible lure member of claim 3 further comprising a pair of forward appendages, each of which has an S-shape.

5. The flexible lure member of claim 4 further comprising a jig-type hook having a weight integral therewith, said hook penetrating said body along a central axis thereof.

6. The flexible lure member of claim 1 wherein:
   each of said foot members has a first ridge protruding therefrom in a direction perpendicular to said forward direction of travel, said first ridge being located adjacent the leading edge of the respective foot member; and
   each of said foot members has a breadth sufficient to bias the leading edge thereof in a manner which faces said forward direction of travel.

7. A flexible lure member for use in an artificial lure to simulate the swimming motion of a frog comprising:
   a body which is adaptable to be connected to a fishing line for drawing said body through water in a direction of travel forward relative to said body;
   a pair of elastically flexible appendages attached to the rear of said body, each of said appendages having an S-shape and having a foot member at the distal end thereof, wherein:
      said foot member is biased transversely relative to said forward direction; and
      said foot member has a leading edge which is biased to face said forward direction of travel, the profile height of the leading edge being biased perpendicular to said forward direction of travel and said profile height of the leading edge is at least fifty percent greater than the average thickness of said foot member.

8. A flexible lure member for use in an artificial lure to simulate the swimming motion of a frog comprising:
   a body which is adaptable to be connected to a fishing line for drawing said body through water in a direction of travel forward relative to said body;
   a pair of elastically flexible appendages attached to the rear of said body, each of said appendages having an S-shape and having a foot member at the distal end thereof, wherein:
      said foot member is biased transversely relative to said forward direction;
      said foot member has a leading edge which is biased to face said forward direction of travel, the profile height of the leading edge being biased perpendicular to said forward direction of travel and each of said foot members has a first ridge protruding therefrom in a direction perpendicular to said forward direction of travel, said first ridge being located adjacent the leading edge of the respective foot member and the thickness of each of said foot members at said first ridge thereof is the greatest thickness of said foot member and is at least fifty percent greater than the average thickness of said foot member; and
      each of said foot members has a breadth sufficient to bias the leading edge thereof in a manner which faces said forward direction of travel.

* * * * *